US011512601B2

United States Patent
Dvorozniak et al.

(10) Patent No.: US 11,512,601 B2
(45) Date of Patent: Nov. 29, 2022

(54) AIRFOIL VANE WITH COATED JUMPER TUBE

(71) Applicant: Raytheon Technologies Corporation, Farmington, CT (US)

(72) Inventors: Lucas Dvorozniak, Bloomfield, CT (US); Jon E. Sobanski, Glastonbury, CT (US); David J. Wasserman, Hamden, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 96 days.

(21) Appl. No.: 16/876,197

(22) Filed: May 18, 2020

(65) Prior Publication Data

US 2021/0355834 A1 Nov. 18, 2021

(51) Int. Cl.
*F01D 5/28* (2006.01)
*F01D 5/18* (2006.01)

(52) U.S. Cl.
CPC .............. *F01D 5/284* (2013.01); *F01D 5/18* (2013.01); *F01D 5/288* (2013.01); *F05D 2300/131* (2013.01); *F05D 2300/2261* (2013.01); *F05D 2300/611* (2013.01)

(58) Field of Classification Search
CPC . F01D 5/284; F01D 5/18; F01D 5/288; F05D 2300/131; F05D 2300/611; F05D 2300/2261
USPC ...................................................... 416/241 B
See application file for complete search history.

(56) References Cited

U.S. PATENT DOCUMENTS

| 3,271,004 | A | * | 9/1966 | Smuland | ................. F01D 5/187 416/95 |
| 6,025,078 | A | * | 2/2000 | Rickerby | .............. C04B 35/486 427/419.2 |
| 9,926,787 | B2 | | 3/2018 | Ahmad | |
| 10,018,062 | B2 | | 7/2018 | Waite et al. | |
| 10,450,881 | B2 | | 10/2019 | Mugglestone | |
| 10,544,702 | B2 | | 1/2020 | Johnson et al. | |
| 2003/0002979 | A1 | | 1/2003 | Koschier | |
| 2003/0175122 | A1 | * | 9/2003 | Zhao | ........................ F01D 5/14 416/241 B |
| 2016/0341054 | A1 | | 11/2016 | Harris et al. | |
| 2017/0044915 | A1 | * | 2/2017 | Mugglestone | .......... F01D 25/12 |
| 2019/0153879 | A1 | | 5/2019 | Vetters | |
| 2020/0248569 | A1 | * | 8/2020 | Whittle | ................. F01D 25/162 |

FOREIGN PATENT DOCUMENTS

| EP | 3075531 | 10/2016 |
| WO | 2015012918 | 1/2015 |
| WO | 2015169555 | 11/2015 |
| WO | 2017063786 | 4/2017 |

OTHER PUBLICATIONS

European Search Report for European Patent Application No. 21174493.3 dated Oct. 4, 2021.

* cited by examiner

*Primary Examiner* — J. Todd Newton

(74) *Attorney, Agent, or Firm* — Carlson, Gaskey & Olds, P.C.

(57) ABSTRACT

An airfoil vane includes an outer ceramic wall that defines an airfoil section and a cavity that extends through the airfoil section. A jumper tube is disposed in the cavity for transferring cooling air. The jumper tube includes a wall, a through-passage circumscribed by the wall, and a thermal barrier coating disposed on the wall.

13 Claims, 3 Drawing Sheets

AIRFOIL VANE WITH COATED JUMPER TUBE

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section may include low and high pressure compressors, and the turbine section may also include low and high pressure turbines.

Airfoils in the turbine section are typically formed of a superalloy. Ceramic materials are also being considered for airfoils. Among other attractive properties, ceramics have high temperature resistance. Despite this attribute, however, there are unique challenges to implementing ceramics in airfoils.

SUMMARY

An airfoil vane according to an example of the present disclosure includes an outer ceramic wall that defines an airfoil section and a cavity that extends through the airfoil section. A jumper tube is disposed in the cavity for transferring cooling air. The jumper tube includes a wall, a through-passage circumscribed by the wall, and a thermal barrier coating disposed on the wall.

In a further embodiment of any of the foregoing embodiments, the wall has an interior side facing toward the through-passage and an exterior side facing toward the outer ceramic wall, and the thermal barrier coating is disposed on the exterior side.

In a further embodiment of any of the foregoing embodiments, the wall has an interior side facing toward the through-passage and an exterior side facing toward the outer ceramic wall, and the thermal barrier coating is disposed on the interior side.

In a further embodiment of any of the foregoing embodiments, the wall has an interior side facing toward the through-passage and an exterior side facing toward the outer ceramic wall, and the thermal barrier coating is disposed on the exterior side and the interior side.

In a further embodiment of any of the foregoing embodiments, the wall has an interior side facing toward the through-passage and an exterior side facing toward the outer ceramic wall, and the thermal barrier coating is disposed on at least one of the exterior side or the interior side.

In a further embodiment of any of the foregoing embodiments, the wall is composed of a Mo-, Co-, or Ni-based alloy.

In a further embodiment of any of the foregoing embodiments, the wall is composed of a Mo-based alloy.

In a further embodiment of any of the foregoing embodiments, the outer ceramic wall is composed of SiC.

In a further embodiment of any of the foregoing embodiments, the outer ceramic wall is composed of silicon-containing ceramic In a further embodiment of any of the foregoing embodiments, the thermal barrier coating is composed of at least one of zirconia or hafnium-containing material.

In a further embodiment of any of the foregoing embodiments, the wall is composed of silicon-containing ceramic.

In a further embodiment of any of the foregoing embodiments, the wall is composed of SiC.

In a further embodiment of any of the foregoing embodiments, the wall is composed of $Si_3N_4$.

A gas turbine engine according to an example of the present disclosure includes a compressor section, a combustor in fluid communication with the compressor section, and a turbine section in fluid communication with the combustor. The turbine section has an airfoil vane that includes an outer ceramic wall that defines an airfoil section and a cavity extending through the airfoil section, and a jumper tube disposed in the cavity for transferring cooling air. The jumper tube has a metallic wall, a through-passage circumscribed by the metallic wall, and a thermal barrier coating disposed on the metallic wall.

In a further embodiment of any of the foregoing embodiments, the metallic wall has an interior side facing toward the through-passage and an exterior side facing toward the outer ceramic wall, and the thermal barrier coating is disposed on at least one of the exterior side or the interior side.

In a further embodiment of any of the foregoing embodiments, the metallic wall is composed of a Mo-, Co-, or Ni-based alloy.

In a further embodiment of any of the foregoing embodiments, the metallic wall is composed of a Mo-based alloy.

In a further embodiment of any of the foregoing embodiments, the outer ceramic wall is composed of silicon-containing ceramic.

In a further embodiment of any of the foregoing embodiments, the outer ceramic wall is composed of SiC.

In a further embodiment of any of the foregoing embodiments, the thermal barrier coating is composed of zirconia.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figures 1, 3:
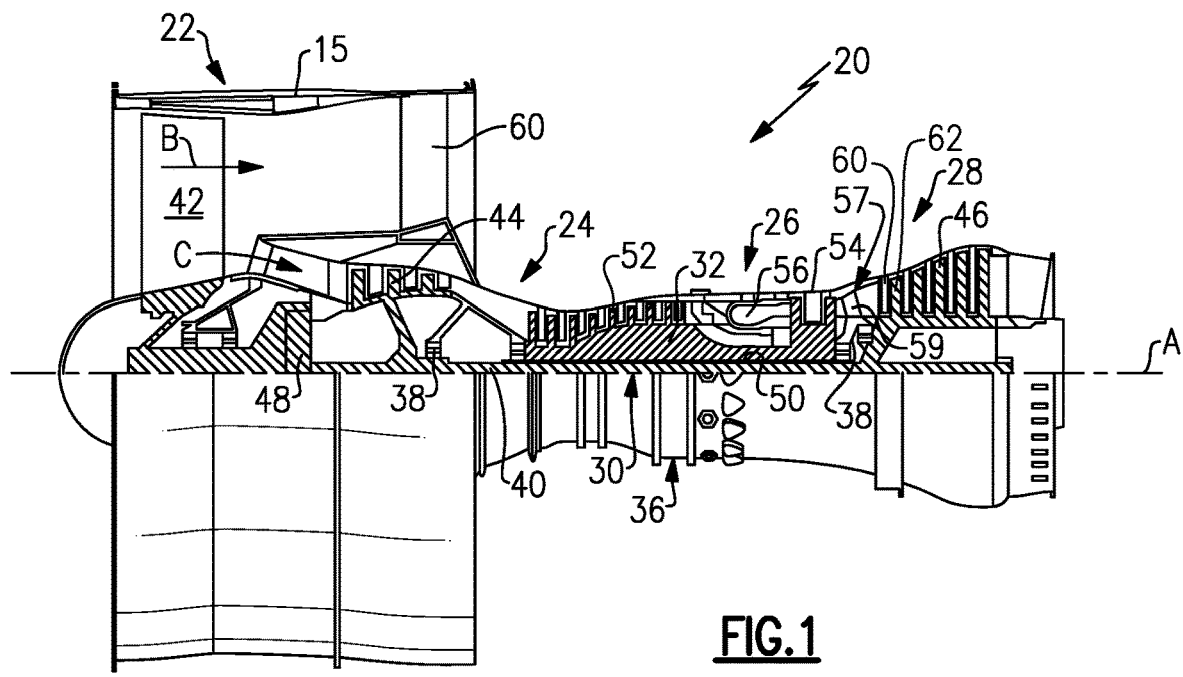
FIG. 1 illustrates a gas turbine engine.
FIG. 3 illustrates an airfoil vane of the turbine section.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

Figure 2:
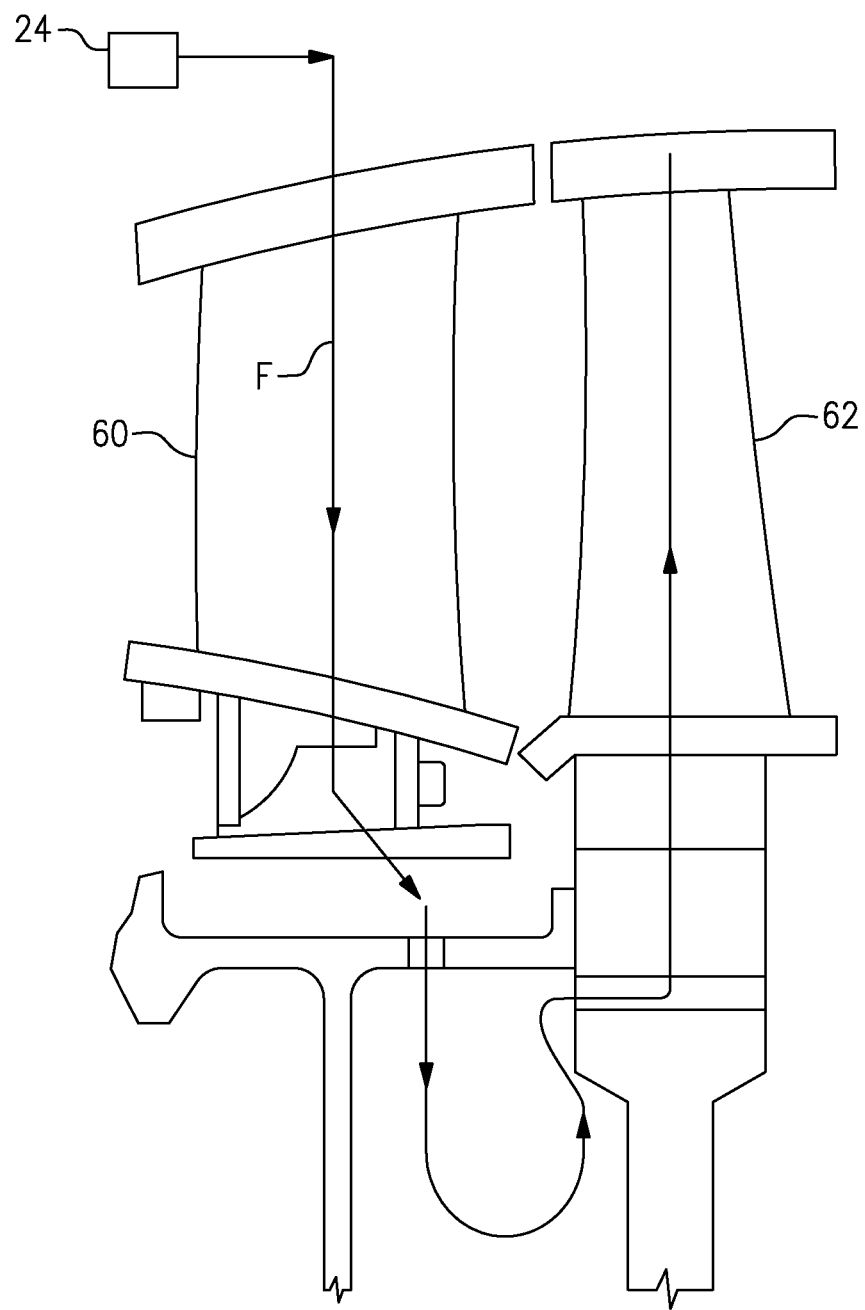
FIG. 2 illustrates a portion of a turbine section of the engine.

FIG. 2 illustrates a view of a portion of the turbine section 28, such as the low pressure turbine 46. It is to be understood, however, that the examples herein may be applied for vanes in other sections of the engine 20, such as but not limited to, the high pressure turbine 54. There is a circumferential row of turbine airfoil vanes 60 followed by a circumferential row of turbine airfoil blades 62. The turbine section 28 operates at high temperatures. In this regard, cooling air (represented at F), such as bleed air from the compressor section 24, is provided for thermal management. As shown, the cooling air F passes through the vane 60 and is provided to downstream components, which in this example are the blades 62. As will be appreciated, the cooling air may alternatively or additionally be provided to other components.

FIG. 3 illustrates a representative one of the vanes 60. The vane 60 is comprised of an outer ceramic wall 64 that defines an airfoil section 66 of the vane 60. The airfoil section 66 defines the leading and trailing edges and the pressure and suction sides, as is known. In this example, the airfoil section 66 spans from an inner platform 68a to an outer platform 68b, although other end wall designs and support structures may be used.

The ceramic of which the outer ceramic wall 64 is composed is a monolithic ceramic or a ceramic matrix composite ("CMC"). Example ceramic material may include, but is not limited to, silicon-containing ceramics. The silicon-containing ceramic may be, but is not limited to, silicon carbide (SiC) or silicon nitride ($Si_3N_4$). An example CMC may be a SiC/SiC CMC in which SiC fibers are disposed within a SiC matrix.

The outer ceramic wall 64 circumscribes an internal cavity 70 that extends through the airfoil section 66. The cavity 70 may also extend through the platforms 68a/68b and/or other vane support structure. A jumper tube 72 is disposed in the cavity 70 for transferring the cooling air F through the vane 60 to the downstream component. For example, the jumper tube 72 is attached to one or both of the platforms 68a/68b and/or other vane support structure. In some examples, the jumper tube 72 may be in contact with a portion of the sides of the cavity 70 (the interior side of the outer ceramic wall 64). However, to reduce thermal conductance, the jumper tube 72 is alternatively attached with a gap completely around the jumper tube 72 so that it is not in contact with the outer ceramic wall 64. The gap is empty but in some examples there may be a baffle between the jumper tube 72 and the outer ceramic wall 64.

Figure 4:
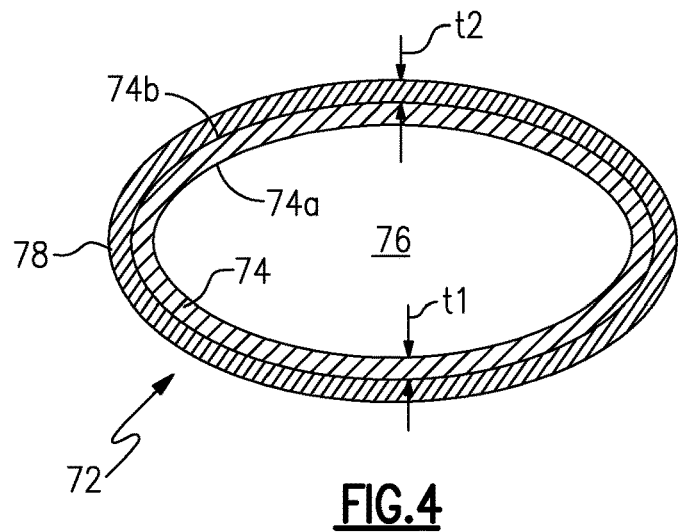
FIG. 4 illustrates a sectioned view of a jumper tube of the airfoil vane.

FIG. 4 illustrates a sectioned view through a representative portion of the jumper tube 72. The jumper tube 72 is comprised of a wall 74, a through-passage 76 circumscribed by the wall 74, and a thermal barrier coating 78 disposed on the wall 74. For example, the wall 74 is composed of a metallic alloy. Example alloys that have good strength and thermal resistance are a Mo-, Co-, or Ni-based alloys. The metallic alloys may be formed into the geometry of the jumper tube 72 from sheet-metal, or by additive manufacturing or other process applicable for making sheets or tubes. Optionally, a bond coat, such known MCrAlY coatings, may be provided between the wall 74 and the thermal barrier coating 78 to facilitate adherence of the coating 78. In alternate examples, the wall 74 is formed of a ceramic material for additional thermal insulation effect, such as any of the ceramic materials discussed above for the ceramic wall 64. The ceramic wall 74 may also facilitate a good thermal expansion match with the ceramic wall 64 to maintain spacing in the cavity 70 and reduce thermal stresses at attachments. As shown, the cross-section of the jumper tube 72 has an oval shape. It is to be understood, however, that the cross-sectional shape, as well as the cross-sectional area of the through-passage 76, can be varied in accordance with the geometry of the cavity 70 and flow of the cooling air F.

The wall 74 has an interior side 74a that faces toward the through-passage 76 and an exterior side 74b that faces toward the outer ceramic wall 64 (FIG. 3). In this example, the thermal barrier coating 78 is disposed on the exterior side 74b, while the interior side 74a is uncoated. For instance, substantially the entire surface area of the exterior side 74b has the thermal barrier coating 78. The thermal barrier coating 78 is composed of a ceramic material. For example, the ceramic material includes zirconia and/or a hafnium-containing material. Example zirconia ceramics may include, but are not limited to, yttria stabilized zirconia or gadolinia stabilized zirconia. Example hafnium-containing ceramics may include, but are not limited to, $HfO_2$ and $HfSiO_4$. In a further example, to facilitate resistance to thermal strain, the thermal barrier coating 78 has a columnar microstructure in which the columns are oriented perpendicularly to the localized wall 74. Such a microstructure can be produced via electron-beam physical vapor deposition.

In general, vanes formed of superalloys employ a thermal management strategy that involves cooling the vane as much as possible, to avoid exceeding the temperature limit of the superalloy and to limit effects of creep and fatigue, without much regard to thermally induced internal stresses as the superalloy strength/toughness enables this to be a secondary concern. Ceramic materials as in the outer ceramic wall 64, however, have higher maximum use temperatures in comparison to metallic superalloys. Therefore, vanes formed of ceramic materials have no need to employ the same thermal management strategy that is used for superalloy vanes.

Additionally, ceramic materials have significantly lower thermal conductivity than superalloys and do not possess the same strength and ductility characteristics, making them more susceptible to distress from thermal gradients and the thermally induced stresses those cause. Therefore, although maximum cooling may be desirable for superalloy vanes, cooling of a ceramic vane may exacerbate thermal gradients and thus be counter-productive to meeting durability goals. In this regard, the thermal barrier coating 78 of the jumper tube 72 serves to insulate the outer ceramic wall 64 from the relatively cool air (F) flowing through the jumper tube 72. Secondarily, to the extent that heat is conducted through the outer ceramic wall 64, the thermal barrier coating 78 may also serve to insulate the cooling air (F) flowing through the jumper tube 72 from the heat to thereby facilitate maintaining the cooling air at a relatively low temperature for cooling of the destined downstream component. Moreover, as temperatures may be high in the cavity 70, the thermal barrier coating 78 may also serve to thermally protect the metal alloy of the wall 74.

Figure 5:
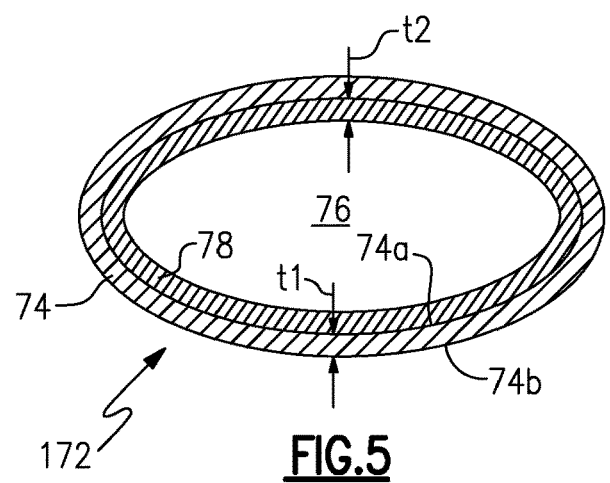
FIG. 5 illustrates another example jumper tube that is coated on the inside.

FIG. 5 illustrates another example jumper tube 172, which is the same as the jumper tube 72 except that the thermal barrier coating 78 is disposed on the interior side 74a of the wall 74. For instance, substantially the entire surface area of the interior side 74a has the thermal barrier coating 78. In this configuration, the thermal barrier coating 78 still provides the insulation discussed above, however, the exterior side 74b of the wall 74 is uncoated. For instance, the exterior side 74b is thereby available for welding or other operations that are amenable to metal but not ceramic.

Figure 6:
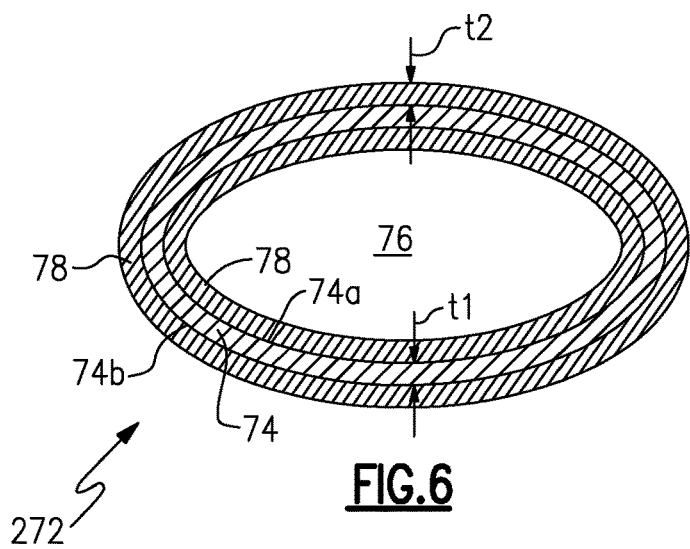
FIG. 6 illustrates another example jumper tube that is coated on the inside and outside.

FIG. 6 illustrates another example jumper tube 272, which is the same as the jumper tube 72 except that the thermal barrier coating 78 is also disposed on the interior side 74a of the wall 74. That is, the wall 74 is coated on its interior and exterior sides 74a/74b. For instance, substantially the entire surface areas of the interior and exterior sides 74a/74b have the thermal barrier coating 78. In this configuration, the thermal barrier coating 78 provides maximized insulation.

As will be appreciated from this disclosure, the thickness (t1) of the wall 74 and the thickness (t2) of the thermal barrier coating 78 can be selected in accordance with processing and performance requirements. In general, the thickness (t1) is from about 100 micrometers to about 800 micrometers, and the thickness (t2) is from about 100 micrometers to about 800 micrometers. Given this description, those of ordinary skill in the art will recognize other thicknesses to suit their particular implementation.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:
1. An airfoil vane comprising:
an outer ceramic wall defining an airfoil section and a cavity extending through the airfoil section; and
a jumper tube disposed in the cavity for transferring cooling air, the jumper tube including a wall and a through-passage circumscribed by the wall, the wall including an interior side facing toward the through-passage and an exterior side facing toward the outer ceramic wall, and a thermal barrier coating disposed on at least the interior side of the wall;
wherein the exterior side is uncoated, the outer ceramic wall is composed of silicon-containing ceramic, and the thermal barrier coating is composed of hafnium-containing material.

2. The airfoil vane as recited in claim 1, wherein the wall is composed of a Mo-, Co-, or Ni-based alloy.

3. The airfoil vane as recited in claim 2, wherein the wall is composed of the Mo-based alloy.

4. The airfoil vane as recited in claim 2, wherein the outer ceramic wall is composed of silicon carbide (SiC).

5. The airfoil as recited in claim 1, wherein the wall is composed of silicon-containing ceramic.

6. The airfoil as recited in claim 1, wherein the wall is composed of silicon carbide (SiC).

7. The airfoil as recited in claim 1, wherein the wall is composed of silicon nitride ($Si_3N_4$).

8. The airfoil vane as recited in claim 1, wherein the hafnium-containing material includes $HfO_2$.

9. The airfoil vane as recited in claim 1, wherein the hafnium-containing material includes $HfSiO_4$.

10. A gas turbine engine comprising:
    a compressor section;
    a combustor in fluid communication with the compressor section; and
    a turbine section in fluid communication with the combustor,
    the turbine section having an airfoil vane that includes
    an outer ceramic wall defining an airfoil section and a cavity extending through the airfoil section, and
    a jumper tube disposed in the cavity for transferring cooling air, the jumper tube including a metallic wall and a through-passage circumscribed by the metallic wall, the metallic wall including an interior side facing toward the through-passage and an exterior side facing toward the outer ceramic wall, and a thermal barrier coating disposed on at least the interior side of the metallic wall;
    wherein the exterior side is uncoated, the outer ceramic wall is composed of silicon-containing ceramic, and the thermal barrier coating is composed of hafnium-containing material.

11. The gas turbine engine as recited in claim 10, wherein the metallic wall is composed of a Mo-, Co-, or Ni-based alloy.

12. The gas turbine engine as recited in claim 11, wherein the metallic wall is composed of a Mo-based alloy.

13. The gas turbine engine as recited in claim 11, wherein the outer ceramic wall is composed of silicon carbide (SiC).

* * * * *